United States Patent [19]
Ishii

[11] Patent Number: 5,309,249
[45] Date of Patent: May 3, 1994

[54] OPTICAL DISC REPRODUCING APPARATUS HAVING DISPLAYED MODE CONTROL KEY FUNCTIONS WHICH ARE CONTROLLED BY DETECTION OF THE TYPE OF DISC BEING REPRODUCED

[75] Inventor: Toshiyuki Ishii, Kanagawa, Japan
[73] Assignee: Sony Corporation, Tokyo, Japan
[21] Appl. No.: 806,600
[22] Filed: Dec. 12, 1991

[30] Foreign Application Priority Data
Dec. 27, 1990 [JP] Japan .................. 2-414670

[51] Int. Cl.⁵ .................. H04N 5/781; G11B 7/00
[52] U.S. Cl. .................. 358/342; 358/341; 358/343
[58] Field of Search .............. 358/342, 341, 343, 335, 358/310; 360/18, 19.1, 27, 33.1; 340/706, 707, 709, 710, 711, 712; 369/32, 47, 58

[56] References Cited

U.S. PATENT DOCUMENTS

| | | | |
|---|---|---|---|
| 4,667,299 | 5/1987 | Dunn | 364/708 |
| 4,742,508 | 3/1988 | Lee et al. | 369/32 |
| 4,908,612 | 3/1990 | Bromley et al. | 340/711 |
| 5,130,967 | 7/1992 | Tanaka et al. | 369/32 |

FOREIGN PATENT DOCUMENTS

| | | | |
|---|---|---|---|
| 0390041A2 | 10/1990 | European Pat. Off. | H04B 1/20 |
| 0436877 | 7/1991 | European Pat. Off. | |
| 61-58024 | 3/1986 | Japan . | |
| 62-293415 | 12/1987 | Japan . | |
| 3-196323 | 8/1991 | Japan . | |

Primary Examiner—Jeffery Brier
Assistant Examiner—Khoi Truong
Attorney, Agent, or Firm—Philip M. Shaw, Jr.

[57] ABSTRACT

An optical disc reproducing apparatus in which the type of the optical discs 2 is discriminated by a disc type discriminating device, the function of a pointing device 74 is displayed by a plurality of light emitting diodes 77 provided in the pointing device and in which a controller performs a switching control of the function display by the light emitting diodes 77 depending on the type of the optical disc 2 indicated by a discriminating output of the disc type discriminating device so that the operability of the CD-I player may be improved because the functions of the pointing device associated with the types of the optical discs to be reproduced are displayed by a display device provided in the pointing device.

4 Claims, 6 Drawing Sheets

OPTICAL DISC REPRODUCING APPARATUS HAVING DISPLAYED MODE CONTROL KEY FUNCTIONS WHICH ARE CONTROLLED BY DETECTION OF THE TYPE OF DISC BEING REPRODUCED

BACKGROUND OF THE INVENTION

This invention relates to an optical disc reproducing apparatus for reproducing a so-called compact disc interactive (CD-I) on which the video information, such as picture or letter information, computer data, application programs etc., are recorded besides the audio information.

There is currently proposed a system, known as a CD-I system, in which video data, such as natural picture, RGB graphics, color lookup table graphics, animation etc., computer data, or application programs, abbreviated hereinafter to programs, are recorded on a compact disc, in addition to audio data, and in which a user may use these data interactively. Inasmuch as this CD-I system has the functions of reproducing the voice, letters or pictures, and executing program(s), and may be used in connection with AV devices for mainly audio and video information and electronic publication mainly of letter or character information, as well as educational or amusement devices, which rely upon program execution, it is thought to be a promising new type media system.

The CD-I system is made up of an optical disc on which audio data, video data or the like are recorded, referred to hereinafter as a CD-I disc, and a player for reproducing a CD-I disc, referred to hereinafter as a CD-I Player. Various specifications have been prescribed in connection with the CD-I system with a view to maintenance of interchangeability and extensive propagation for domestic use.

For example, in a CD-I disc, audio and video data, for which high accuracy is not a particular requirement, are recorded in accordance with a so-called form 2 of the CD-I data format, whilst computer data or programs, which are in need of error detection and correction, are recorded in accordance with a so-called form 1 of the CD-I data format.

With the CD-I system, four sound quality levels may be used, so that the audio data are processed with four-level data compression or coding, depending on the desired sound quality level, before being recorded on the CD-I disc. Thus the recorded data may be 16-bit PCM (Pulse Code Modulation) audio data for a conventional compact disc (PCM Audio Data), 8- or 4-bit ADPCM (Adaptive Differential Pulse Code Modulation) audio data, or so-called A-level, B-level or C-level audio data (ADPCM Audio Data).

On the other hand, four picture quality types, namely the picture quality for natural pictures, e.g. color photographs, that for RGB graphics, that for color lookup table graphics (CLUT graphics) and that for animation, may be used with the CD-I system, so that the video data are processed with data compression or encoding in accordance with the desired picture quality before being recorded on the CD-I disc. That is, with the picture quality for a natural picture, the video data are encoded with 8 bits per pixel and processed with non-interlaced DYUV encoding for recording. With the picture quality for RGB graphics, three color signals (RGB signals) for each pixel are encoded with 5 bits for encoding and, with the picture quality for CLUT graphics, the video data are recorded so that 256 colors may be displayed simultaneously by allocating 8 bits for each Pixel. Finally, with the picture quality for animation, the video data for the CLUT graphics are processed with data compression by the so-called run-length coding for recording.

A 68000 series microcomputer, which is a 16-bit CPU developed by MOTOROLLA Inc. is preferentially employed as a microcomputer making up a CD-I player (CPU). A so-called compact disc real-time operating system (CD-RTOS), corresponding to the existing OS-9, an operating system developed by MICROWEAR Inc. but added to by input/output managers and drivers for graphics/visual, pointer and audio processing operations, is preferentially employed as an operating system (OS), in consideration of program interchangeability and execution efficiency on the CD-I disc. In addition, and X-Y device, which may be accessed on the pixel-by-pixel basis, and a trigger button (for execute/stop), are preferentially employed as input devices. A compact disc (CD), on which only music has been recorded, may also be reproduced with the CD-I system.

It is noted that the disc on which only the PCM audio data are pre-recorded is termed a CD-DA disc, while the disc on which ADPCM audio data other than the PCM audio data, video data and the program(s) etc. are pre-recorded, is termed a CD-I disc and the disc on which the PCM audio data, ADPCM audio data, video data, programs etc. are pre-recorded, is termed a CD-I/CD-DA disc.

In the case of the CD-I disc and the CD-I/CD-DA disc, the mechanical sizes, such as the outside diameter, diameter of the central aperture or thickness, optical parameters, such as refractive index or reflectivity, recording parameters, such as the recording line density, track shape or track pitch, and the operating environment, are selected to be the same as those of the usual compact disc, that is the CD-DA disc.

The CD-I disc, the CD-I/CD-DA disc and the CD-DA disc may be distinguished from one another based on the table-of-contents (TOC) data.

That is, the PSEC information for POINT=A0 is [10] for the CD-I disc and the CD-I/CD-DA disc, whilst the PSEC information for POINT=A0 for the CD-DA disc is [00], so that the CD-I disc and the CD-I/CD-DA disc may be distinguished from the CD-DA disc based on the PSEC information for the POINT=A0. On the other hand, the control fields for POINT=A0, A1 and A2 for the CD-I disc are all [01X0], while the control field for POINT=A0 is [01X0] and the control field for POINT=A1 and A2 for the CD-I/CD-DA disc are [00X0], so that the CD-I disc may be distinguished from the CD-I/CD-DA disc based on the control field information for POINT=A1 and A2.

With, with the CD-I player, it is mandatory that various operations can be set by a pointing device including the X-Y device and a trigger button.

Since the setting operation by the pointing device is performed by picture display means for displaying a picture reproduced by the CD-I player, it is necessary with the conventional CD-I player to actuate the picture display means even when the CD-DA disc dedicated for music reproduction is to be reproduced. Besides, the contents of the picture displayed by the picture display means need to be checked, resulting in poor operability.

If, for overcoming the drawback, special operating means is provided for reproduction of the CD-DA disc, not only the degree of freedom in construction and designing is lowered due to the annexed operating means, but there arises the risk of mistaken operations.

OBJECT AND SUMMARY OF THE INVENTION

In view of the above described status of the art, it is a principal object of the present invention to provide a CD-I player which may be operated in an improved manner responsive to operating inputs by the pointing device.

In accordance with the present invention, there is provided an optical disc reproducing apparatus comprising optical disc reproducing means for reproducing an optical disc on which only audio information is recorded or an optical disc on which video information or the like is recorded in addition to the audio information, a pointing device for commanding a particular operation, provided with an X-Y device and trigger buttons, display means provided in said pointing device for selectively indicating the functions of said pointing device, disc discriminating means for discriminating the type of the optical disc reproduced by said optical disc reproducing means, reproduction controlling means for designating the functions of said pointing device depending on the type of the optical disc designated by a discriminating output of said disc discriminating means, said controlling means accepting a command input by an operator to said pointing device for controlling the operation of said optical disc reproducing means, and display controlling means for switching the display on said display means depending on the type of the optical disc designated by the discriminating output of said disc discriminating means.

DESCRIPTION OF PREFERRED EMBODIMENTS

Figure 1:
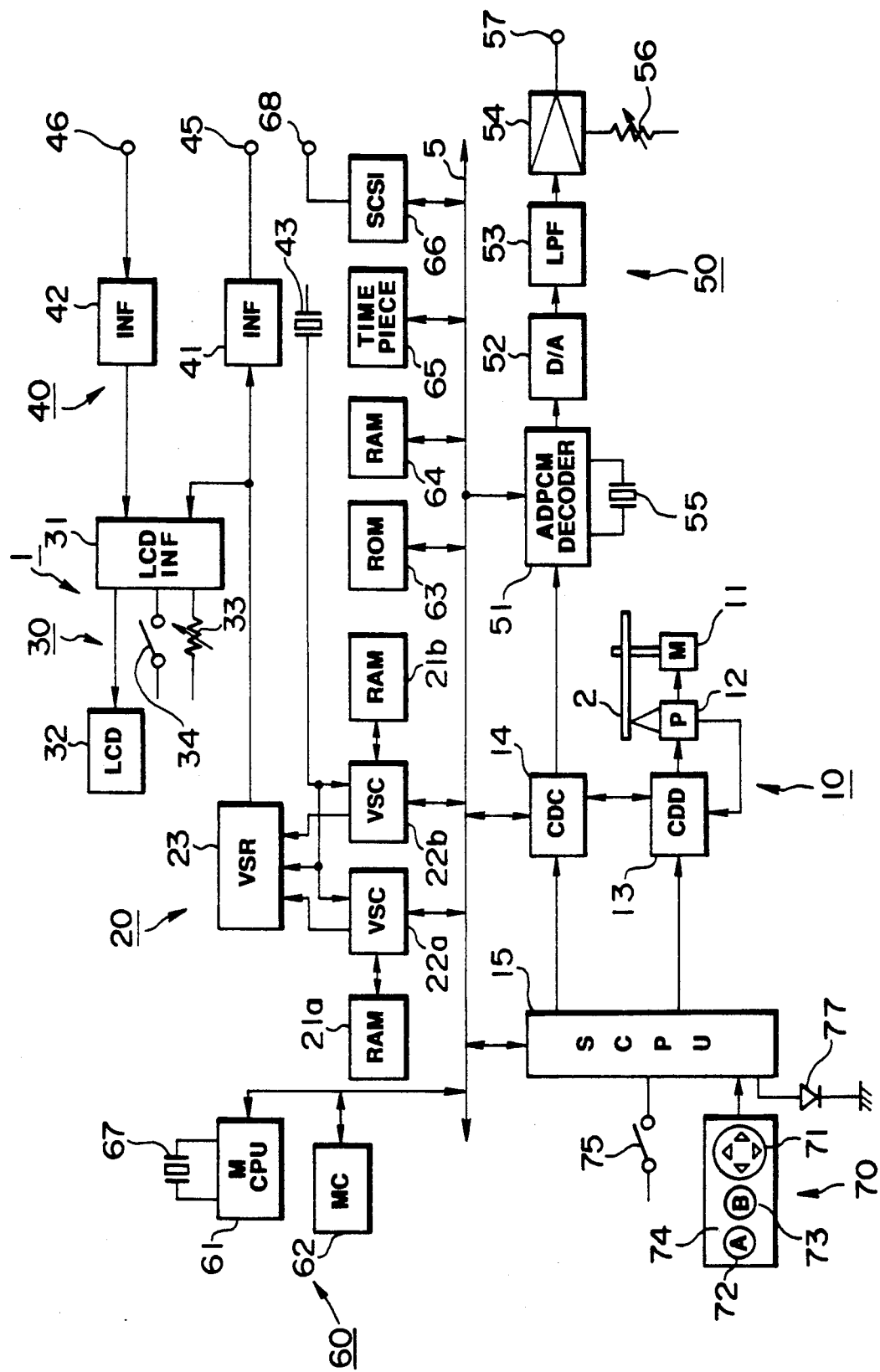
FIG. 1 is a block circuit diagram showing the circuit construction of a CD-I player embodying the present invention.

Referring to the drawings, an optical disc reproducing apparatus embodying the present invention will be explained in detail.

FIG. 1 is a block circuit diagram showing a circuit construction of a portable CD-I player embodying the present invention.

Referring to FIG. 1, the CD-I player 1 is constituted by a disc driving section 10 for reproducing audio data, video data or programs from an optical disc 2, such as a CD-I disc or a CD-DA disc, a picture signal processing section 20 for generating video signals from the video data, a liquid crystal display section 30 for displaying the contents of operation or execution based on the video signals, a picture signal interfacing section 40 for converting the video signals into video signals conforming to, for example, the NTSC system, a voice signal processing section 50 for reproducing audio signals from the audio data, a controller 60 for executing the program and controlling the sections 10, 20 and 50, and an operating section 70 for operation by a user. The disc driving section 10, the picture signal processing section 20, the voice signal processing section 50 and the controller 60 are connected together by a common bus 5.

The disc driving section 10 is constituted by a spindle motor 11 for rotating the CD-I disc 2 at a constant linear velocity (CLV), a pickup 12 for irradiating the CD-I disc 2 with a laser beam and for detecting the intensity of the reflected laser beam for reproducing RF signals, a compact disc drive (CDD) 13 for controlling the spindle motor 11 and the pickup 12 and for demodulating the RF signals to produce audio data, a compact disc error correction circuit (CDC) 14 for performing error detection and correction of modulated data from CDD 13, and a subcomputer (SCPU) 15 for controlling mainly the CDD 13 and the CDC 14. The CDD 13 is provided with a focusing servo circuit, a tracking servo circuit and a thread servo circuit and the like, and for servo-controlling a biaxial device of the pickup 12 and controlling a thread motor, in general a linear motor, for radially moving the pickup 12, to permit the pickup 12 to access the desired track CDD 13 is also provided with, for example, an equalizer, a waveforming circuit, a clock reproducing circuit and an EFM (Eight-to Fourteen Modulation) demodulator, and for reproducing data such as the audio data from the playback RF signals. The CDC 14 performs an error correction on computer data or the like in need of error correction and outputs audio data compressed in accordance with ADPCM (ADPCM Audio Data) under control by the controller 60, video data, computer data and the programs to the bus 5, while directly outputting uncompressed 16-bit audio data (PCM Audio Data), to the voice signal processing section 50. A plurality of LEDs 77, for displaying the functions of a pointing device 74, provided as the operating section 70, are connected to the SCPU 15, which controls the switching of the display of the various functions of the pointing device 74 by the LEDs 77, as will be explained subsequently.

The picture signal processing section 20 includes two channels of video signal processing circuits for picture superposition and switching. Specifically, the picture signal processing circuit is constituted by RAMs 21a, 21b for transiently storing video data transmitted from the CDC 14 over bus 5 by, for example, so-called direct memory accessing (DMA), video controllers (VSCs)

22a, 22b for processing the video data stored in RAMs 21a, 21b with so-called DYUV decoding and run-length decoding etc. for reproducing the video data, and a video synthesizer 23 for superposing and switching the video data from the VSCs 22a, 22b and for converting the video data into analog signals.

The liquid crystal display section 30 is constituted by an LCD interfacing circuit 31 (LCDINF), for driving a liquid crystal display panel 32 (LCD), based on analog video signals from VSR 23. The LCDINF 31 is provided with a rheostat 33 for adjusting the contrast of the LCD 32 and a switch 34 for terminating the display of the LCD 32 for power saving.

The video signal interfacing section 40 is constituted by an interfacing circuit 41, referred to as an INF, for converting the video signals from VSR 23 into video signals conforming to, for example, the NTSC system or the PAL system, an INF 42 connected to input signals to the LCDINF 31 for effecting a conversion which is the reverse of that effected by the INF 41, and a crystal oscillator 43 for supplying clocks of frequencies suited to the respective systems to the VSCs 22a, 22b and VSR 23. The video signals converted by INF 41 into signals conforming to the desired system are outputted via video output terminal 45 to, for example, a television receiver, not shown. On the other hand, video signals from a video tape recorder, not shown, are supplied via video input terminal 46 to the INF 42. The oscillating frequency of the crystal oscillator 43 is 30.202979 MHz and 30.00 MHz for the NTSC system and for the PAL system, respectively.

The voice signal processing section 50 is constituted by an ADPCM decoder 51 for decoding ADPCM audio data transmitted over bus 5 from CDC 14, a digital/analog (D/A) converter 52 for converting the decoded PCM audio data from the ADPCM decoder 51 or the PCM audio data directly transmitted from CDC 14 into analog signals, a low-pass filter (LPF) 53 and an amplifier 54 for amplifying the audio signals converted into the analog signals. The ADPCM decoder 51 is provided with a crystal oscillator 55 of, for example, 16.9 MHz. The amplifier 54 is provided with a volume control 56 for adjusting the sound volume. The audio signals, thus adjusted by the volume control 56, are outputted via audio output terminal 57 to, for example, a headphone, not shown.

The controller 60 is constituted by a 68000 series microcomputer (MCPU) 61, a master controller 62 for decoding the addresses from MCPU 61, a master controller 62 for decoding the addresses from MCPU 61 and controlling the DMA, a ROM 63 for storing, above all, a so-called CD-RTOS (Compact Disc Real-Time Operating System) program, a non-volatile RAM 64 for transient data storage during program execution, a timepiece circuit 65 for time supervision, and a small computer system interface (SCSI) 66 for exchanging data or commands with, for example, with a host computer via data input/output terminal 68. A quartz oscillator 67 for operating the MCPU 61 is provided in the MCPU 61.

The operating section 70 is constituted by the pointing device 74, comprised of an X-Y device 71, which is operated by the user and which may be accessed on the pixel-by-pixel basis, and a door switch 75 for automatically turning on a power switch when the user fails to turn off the switch when closing an upper lid which will be explained subsequently.

An outward aspect of the above described CD-I player 1 will be explained briefly hereinbelow. It is noted that parts and components which are the same as those shown in FIG. 1 are denoted by the same reference numerals.

Figure 2:
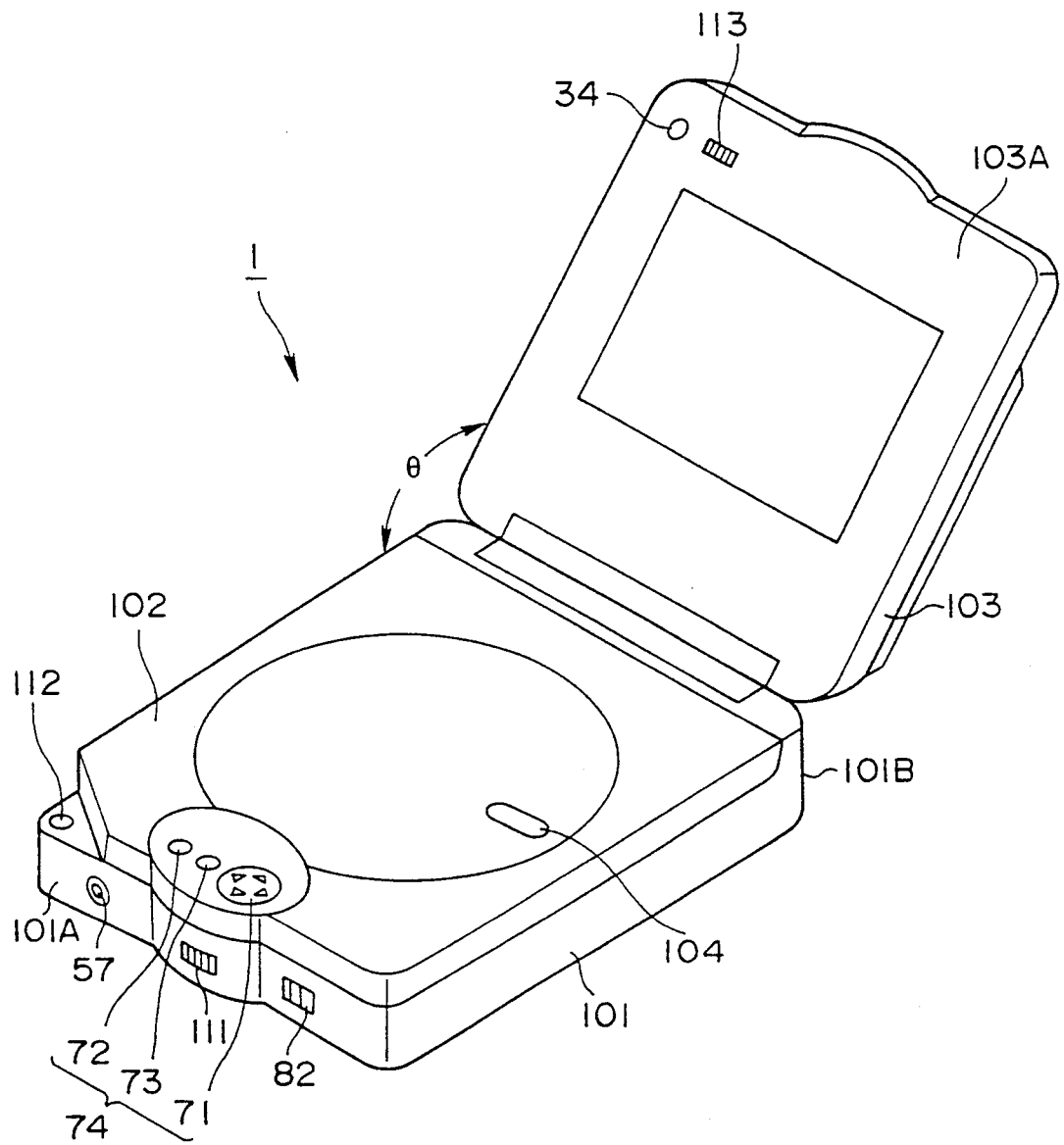
FIG. 2 is a perspective view showing an outward aspect of the CD-I player shown in FIG. 1.

The CD-I player 1 may, for example, be 140 mm in width, 170 mm in length and 60 mm in height, for facilitated portability, as explained previously. Referring to FIG. 2, the CD-I player 1 is provided with a main body section 101, an intermediate lid 102 hinged to the main body section 101 for opening and closure and an outer lid 103 having its side edge hinged to a side edge of the body section 101 for opening and closure.

The above mentioned disc driving device 10, the picture signal interfacing section 20, the picture signal processing section 40, the voice signal processing section 50, the controller 60 and the operating section 70 for operation by the user, are accommodated within the casing of the main body section 101. Referring to FIG. 2, the above mentioned audio output terminal 57, a sound volume adjustment dial 111 for adjusting the volume 56 and a power switch 82 are fitted on a forward surface 101A of the main body section 101, whilst the above mentioned video output terminal 45, video input terminal 46, data input/output terminal 81 and the changeover switch 69 are provided on a rear surface 101B of the main body section 101. An opening button 112 for opening the intermediate lid 102 is provided at an upper forward edge of the main body section 101.

The intermediate lid 102 is opened by pushing the button 112 to permit the loading/unloading of the optical disc 2. The lid 102 is provided with a window 104 in which a transparent member is provided to permit checking of the loaded/unloaded state of the optical disc 2 or the state of its rotation via window 104. The above mentioned X-Y device 71 and the trigger buttons 72, 73 are provided at a forward edge of the intermediate lid 102 so that desired positions in the X and Y directions may be designated on pressing portions of the X-Y device offset from its central portion.

The outer lid 103 may be opened manually by more than 90° and fixed at a predetermined opening position. The above mentioned LCD 32, a contrast dial 113 for adjusting the volume 33 and a switch 34 are provided on a reverse surface 103A of the outer lid 103. On opening the outer lid 103, the LCD 32 is exposed to permit the screen of the LCD 32 to be viewed.

Figure 3:
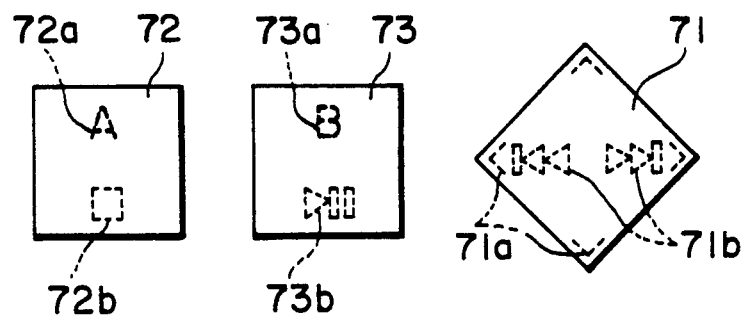
FIG. 3 is a schematic view showing, by dotted lines, display patterns by display means provided in the pointing device of the CD-I player shown in FIG. 2.

Referring now to FIG. 3, with the above described CD-I player, display patterns 71a, 72a and 73a for displaying the functions as a pointing device and display patterns for displaying the functions as a mode designating switch, are formed, respectively, on the X-Y device 71 and the trigger buttons 72 and 73 of the pointing device 74, by the LEDs 77 (FIG. 1), as shown by dotted lines in FIG. 3, and the function display states by the LEDs are switched by and under control of the SCPU 15.

Figure 4:
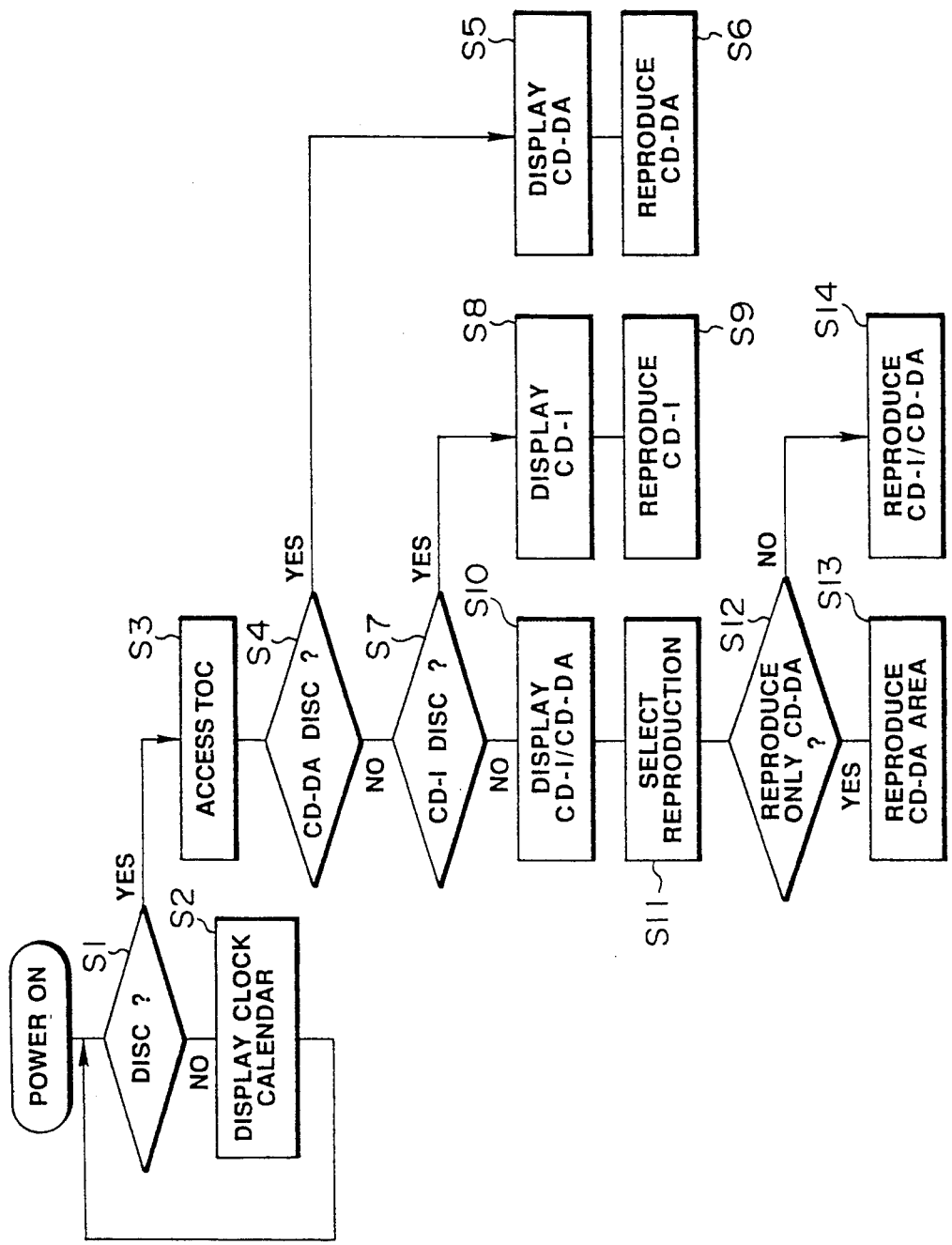
FIG. 4 is a flow chart showing a typical operation of the CD-I player.

The operation of the above described CD-I player 1 is explained by referring to a flow chart of FIG. 4.

When the power switch 82 of the CD-I player 1 is turned on, it is first checked at step S1 if the optical disc 2 has been loaded.

Figure 5:
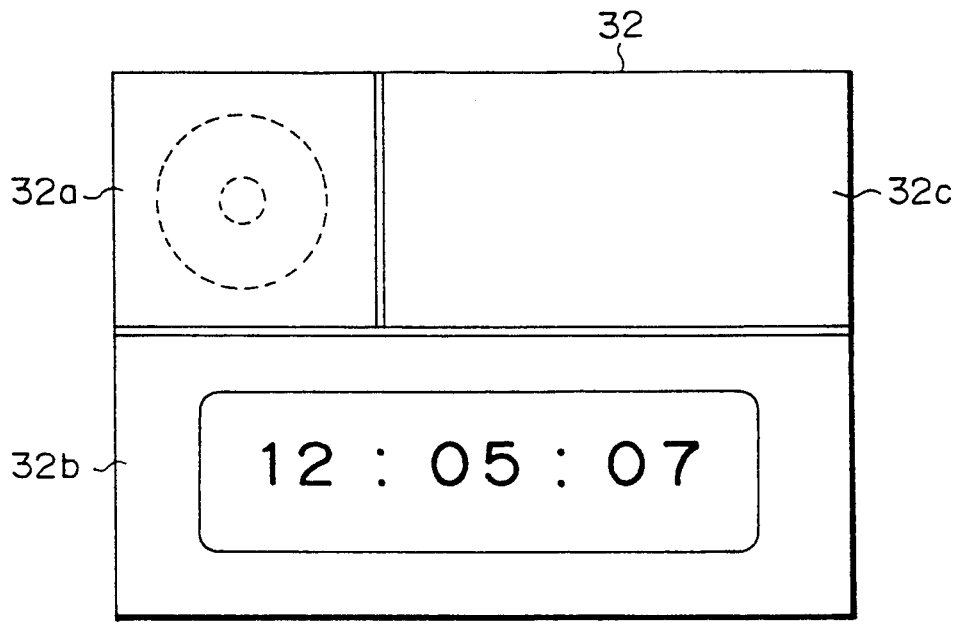
FIG. 5 is a schematic view showing the display contents of a liquid crystal display device of the CD-I player, with the disc not loaded therein.

If the result of checking at the first step S1 is NO, that is, if the disc has not been loaded, control proceeds to the second step S2 to cause that effect to be displayed on LCD 32 and reverts to step S1. This sequence of operations is repeated to wait for loading of the disc 2. Display at the second step S2 is so made that, as shown in FIG. 5, an indication to the effect that the disc is not loaded is made on the display area 32a of the LCD 32, whilst a calendar and time, for example, are displayed on the display area 32b.

If the result of checking at the first step S1 is YES, that is if the optical disc is loaded, control proceeds to step S3 to access the table-of-contents (TOC) area of the disc 2. That is, when the optical disc 2 is loaded into the CD-I player 1, reproduction of the optical disc 2 is initiated. The TOC information recorded in the TOC area of the optical disc 2 is reproduced by the CDC 14 and transmitted to MCPU 61.

At the next, fourth step S4, it is checked if the loaded optical disc 2 is a CD-DA disc. The checking operation at the fourth step S4 is so made that, if the PSEC information for POINT=0 in the TOC area is [00], the loaded optical disc 2 is determined to be a CD-DA disc.

If the result of checking at the fourth step S4 is YES, that is if the loaded optical disc is the CD-DA disc, control proceeds to the fifth step S5 to make a display for the case in which the loaded disc is the CD-DA disc.

Figure 7:
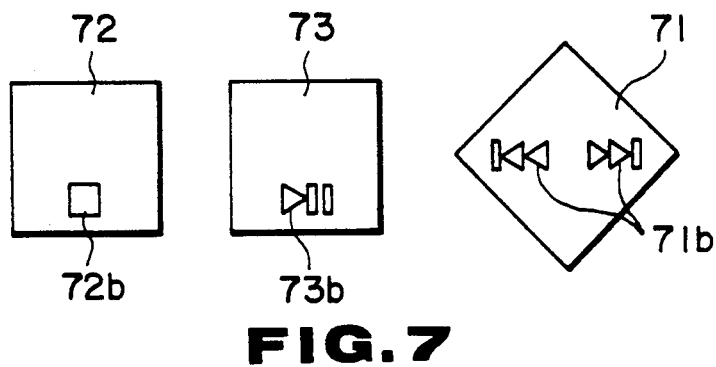
FIG. 7 is a schematic view showing the display states of the pointing device functions with the CD-DA disc loaded in the CD-I player.
Figure 6:
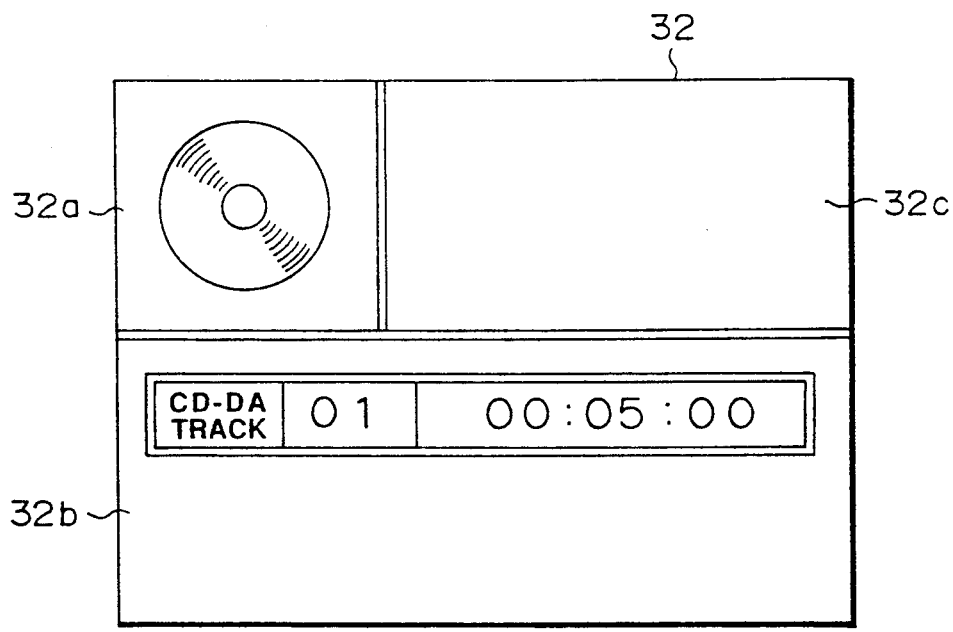
FIG. 6 is a schematic view showing the display contents of a liquid crystal display device of the CD-I player, with the CD-DA disc loaded therein.

It is noted that, at the present fifth step S5, an indication that the CD-DA disc has been loaded is made in the display area 32a of the LCD 32, as shown in FIG. 6, by MCPU 61, at the same time that control is made by SCPU 15 to cause the pointing device 74 to function as a mode designating switch. That is, as shown in FIG. 7, the pointing device 74 has its X-Y device 71 and trigger buttons 73, 72 designated by SCPU 15 as a reproduction command key and as braking and stop keys, respectively, whilst the LEDs 77 are controlled to display the corresponding function display patterns 71b, 73b, and 72b. In this manner, permits the user may operate the X-Y device 71 and the trigger buttons 72 and 73 easily and reliably based on the display by the LEDs 77 provided on the pointing device 74.

At the next sixth step S6, the operations on the X-Y device 71 and the trigger buttons 72 and 73 are accepted and the CD-DA disc is reproduced in accordance with these operations. That is, the PCM audio data, reproduced by the disc driving section 10 from the optical disc 2, are converted by the D/A converter 52 and LPF 53 into audio signals, which are outputted at the headphone by means of amplifier 54 and audio output terminal 57.

If the result of checking at the fourth step S4 is NO, that is if the loaded optical disc 2 is not the CD-DA disc, control proceeds to the seventh step S7 to check if the optical disc 2 is a CD-I disc. This checking at the seventh step S7 is so made that, if the information of the control fields for POINT=A1 and A2 in the TOC area is [00X0], the loaded optical disc 2 is determined to be a CD-I/CD-DA disc and, if otherwise, the disc 2 is determined to be a CD-I disc.

If the result of checking at the seventh step S7 is YES, that is if the loaded optical disc 2 is the CD-I disc, control proceeds to the eighth step S8 to cause a display to be made for the case in which the loaded optical disc 2 is the CD-I disc.

Figure 9:
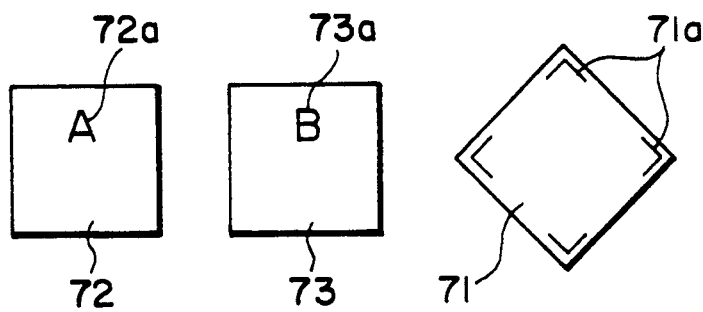
FIG. 9 is a schematic view showing the display states of the pointing device functions with the CD-I disc or the CD-I/CD-DA disc loaded in the CD-I player.
Figure 8:
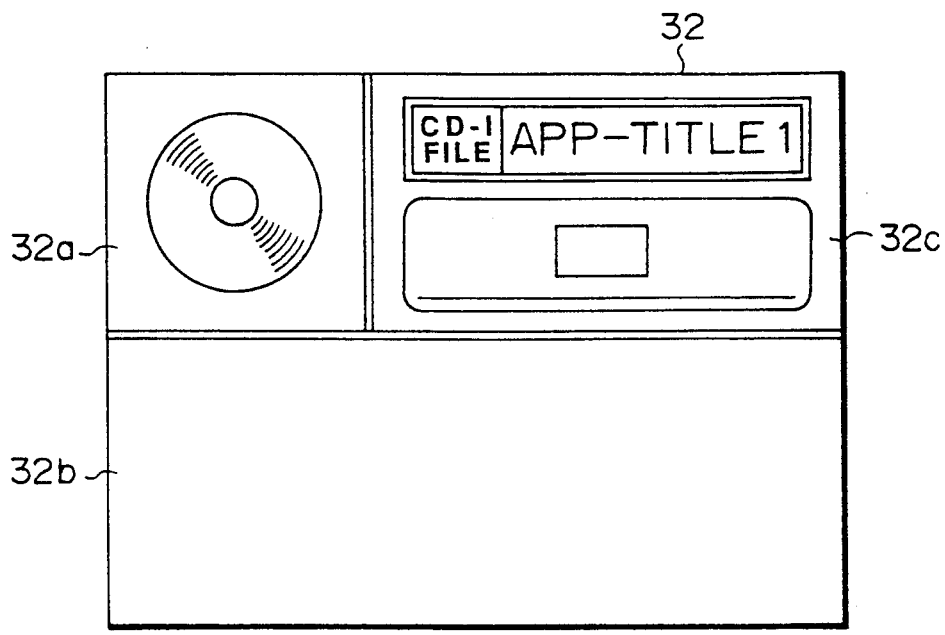
FIG. 8 is a schematic view showing the display contents of a liquid crystal display device of the CD-I player, with the CD-I disc loaded therein.

It is noted that, at the present eighth step S8, an indication that the CD-I disc has been loaded is made in the display area 32a of the LCD 32, as shown in FIG. 8, by MCPU 61, at the same time that a title etc. of an application program is indicated on the display area 32c. In addition, the function of the pointing device 74 is displayed by the LEDs 77 under control of the SCPU 15. That is, as shown in FIG. 9, the pointing device 74 has its X-Y device 71 and trigger buttons 72, 73 designated by SCPU 15 as an X-Y direction command key and as execute and stop keys, respectively, whilst the LEDs 77 are controlled to display the corresponding function display patterns 71a, 72a and 73a.

At the next ninth step S9, the operations on the X-Y device 71 and the trigger buttons 72 and 73 are accepted and the CD-I disc is reproduced to execute the program in accordance with these operations. That is, the program reproduced by the disc driving section 10 is transmitted to, for example, the RAM 64, so as to be in MCPU 61 in accordance with the program stored in RAM 64. As a result of the program execution, natural pictures, animations etc. are generated by the picture signal processing section 20 and displayed on the entire screen of the LCD 32, at the same time that music or narration, for example, is reproduced by the voice signal processing section 50 and outputted at the headphone.

If the result of checking at the seventh step S7 is NO, that is if the loaded optical disc 2 is a CD-I/CD-DA disc, control proceeds to the tenth step S10 to cause a display to be made for the case in which the loaded optical disc is the CD-I/CD-DA disc.

Figure 10:
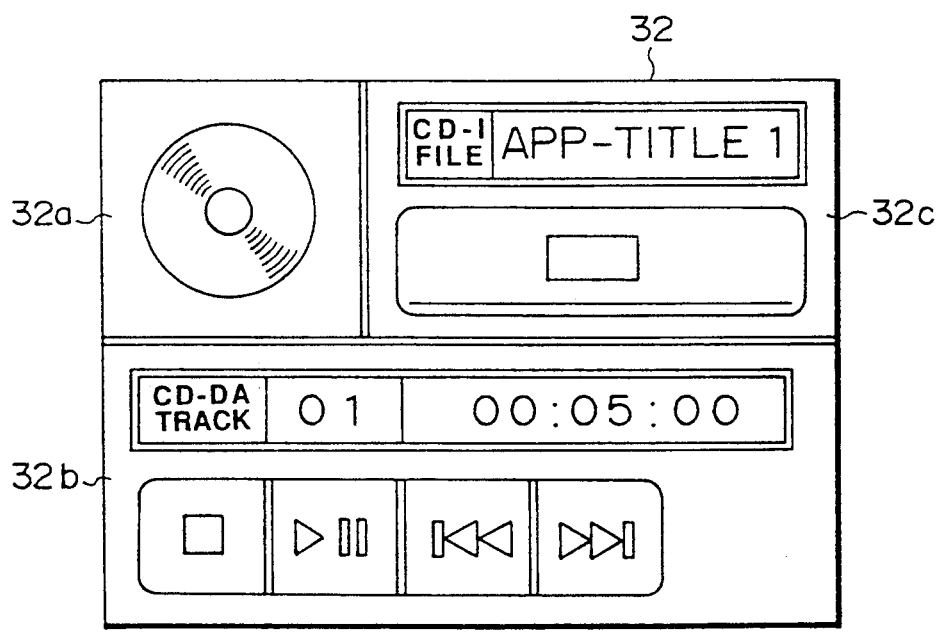
FIG. 10 is a schematic view showing the display contents of a liquid crystal display device of the CD-I player, with the CD-I/CD-DA disc loaded therein.

It is noted that, at the present tenth step S10, an indication that the CD-I/CD-DA disc has been loaded is made in the display area 32a of the LCD 32, as shown in FIG. 10, by MCPU 61, at the same time that indications necessary for music reproduction, such as PLAY, AMS or STOP, are made on the display area 32a and a title etc. of an application program in indicated on the display area 32e. In addition, the function of the pointing device 74 is displayed by the LEDs 77 under control of the SCPU 15. That is, as shown in FIG. 9, the pointing device 74 has its X-Y device 71 and trigger buttons 72, 73 designated by SCPU 15 as an X-Y direction command key and as execute and stop keys, respectively, whilst the LEDs 77 are controlled to display the corresponding function display patterns.

At the next eleventh step S11, the command for reproduction by the X-Y device 71 and the trigger buttons 72 and 73 is accepted. At the next twelfth step S12, it is checked if, as regards the command for reproduction, accepted at the step S11, only the CD-DA area of the CD-I/CD-DA disc is to be reproduced.

If the result of checking at the twelfth step S12 is yes, that is if only reproduction of the CD-DA area has been commanded, control proceeds to the thirteenth step S13 where only the CD-DA area of the CD-I/CD-DA disc is reproduced under the commands by the X-Y device 71 and the trigger buttons 72 and 73.

If the result of checking at the twelfth step S12 is NO, that is if execution of the application program is commanded, control proceeds to the fourteenth step S14 where the commands by the X-y device 71 and the trigger buttons 72 and 73 are accepted in accordance with the application program to reproduce the CD-I/CD-DA disc for executing the application program.

From the foregoing it is seen that the present invention provides an optical disc reproducing apparatus wherein the functions of the pointing device including the X-Y button and the trigger buttons are displayed by display means provided in the pointing device, so that the setting for various operations may be achieved easily using the pointing device, and hence the operability of the CD-I player responsive to the operational commands by the pointing device may be improved.

What is claimed is:

1. An optical disc reproducing apparatus comprising:
   optical disc reproducing means for reproducing an optical disc on which only audio digital information is recorded or an optical disc on which non-audio digital information is recorded in addition to the audio information, a pointing device for generating a command signal corresponding to one of a plurality of operational modes of the optical disc reproducing means in response to a selection input by a user of the optical disc reproducing apparatus, provided with an X-Y device and trigger buttons, display means provided in the pointing device for indicating the operational modes which can be selected by the pointing device, disc discriminating means connected to the optical disc reproducing means for discriminating the type of the optical disc being reproduced by the optical disc reproducing means, reproduction controlling means connected to the pointing device for designating the operational modes which are selectable by the pointing device depending on the type of the optical disc designated by a discriminating output of the disc discriminating means, the reproduction controlling means, upon receipt of a command signal from the pointing device, controlling the operation of the optical disc reproducing means to perform a selected operational mode, and display controlling means for changing the display on the display means depending on the type of the optical disc designated by the discriminating output of the disc discriminating means.

2. The optical disc reproducing apparatus as claimed in claim 1 wherein function display patterns on the display means are provided by a plurality of light emitting diodes.

3. The optical disc reproducing apparatus as claimed in claim 1 wherein the reproduction controlling means designate the X-Y device and the trigger buttons of the pointing device as a reproduction command key, a braking key, and a stop key, respectively, when the optical disc on which only the audio information is recorded is reproduced by the optical disc reproducing means, the reproduction controlling means accepting the command signal of the pointing device for controlling the operation of the optical disc reproducing means.

4. The optical disc reproducing apparatus as claimed in claim 1 wherein the reproduction controlling means designate the X-Y device and the trigger buttons of the pointing device as an X-Y direction command key, an execute key, and a stop key, respectively, when the optical disc on which the video information is recorded in addition to the audio information is reproduced by the optical disc reproducing means, the reproduction controlling means accepting the command signal of the pointing device for controlling the operation of the optical disc reproducing means.

* * * * *